US011190579B1

(12) United States Patent
Barton et al.

(10) Patent No.: US 11,190,579 B1
(45) Date of Patent: Nov. 30, 2021

(54) EDGE TO MULTI-CLOUD DATA PROCESSING AND GOVERNANCE

(71) Applicant: Cisco Technology, Inc., San Jose, CA (US)

(72) Inventors: Robert E. Barton, Richmond (CA); Stephan Edward Friedl, Frederick, CO (US); Anoop Mohan, San Ramon, CA (US); Norbert Heusser, Bornheim (DE); Yogesh Kumar Soni, Fremont, CA (US); Daniel Eckstein, Bonn (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/931,868

(22) Filed: Jul. 17, 2020

(51) Int. Cl.
 *H04L 29/08* (2006.01)
 *H04L 12/26* (2006.01)
 *H04L 12/24* (2006.01)
 *H04L 29/06* (2006.01)

(52) U.S. Cl.
 CPC .......... *H04L 67/10* (2013.01); *H04L 41/0893* (2013.01); *H04L 43/0876* (2013.01); *H04L 63/20* (2013.01); *H04L 67/12* (2013.01)

(58) Field of Classification Search
 CPC ......... H04L 67/10; H04L 67/12; H04L 63/20; H04L 41/0893; H04L 43/0876
 See application file for complete search history.

(56) References Cited

U.S. PATENT DOCUMENTS

| | | | |
|---|---|---|---|
| 9,811,387 B2 | 11/2017 | Baughman et al. | |
| 9,813,418 B1 | 11/2017 | Banerjee | |
| 10,007,513 B2 | 6/2018 | Malladi et al. | |
| 10,154,019 B2 | 12/2018 | McRoberts et al. | |
| 10,230,798 B2 | 3/2019 | Doraiswamy et al. | |
| 10,333,849 B2 | 6/2019 | Masurekar et al. | |
| 10,341,868 B2 | 7/2019 | Ross et al. | |
| 10,440,096 B2 | 10/2019 | Sabella et al. | |
| 10,637,783 B2 | 4/2020 | Singuru | |
| 10,693,878 B2 | 6/2020 | Frahim et al. | |
| 10,805,374 B1 * | 10/2020 | Wilczynski | ........... H04L 65/602 |

(Continued)

FOREIGN PATENT DOCUMENTS

CN 109862087 A 6/2019

OTHER PUBLICATIONS

"Authenticating & Authorizing Devices using MQTT with Auth0", online: https://auth0.com/docs/integrations/authenticating-devices-using-mqtt, printed Jul. 2020, 12 pages.

(Continued)

*Primary Examiner* — Kim T Nguyen
(74) *Attorney, Agent, or Firm* — Behmke Innovation Group LLC; Kenneth J. Heywood; James J. Wong (57) ABSTRACT

In one embodiment, a networking device at an edge of a network extracts data from traffic in the network using a plurality of protocol connectors of the networking device. The networking device normalizes the data extracted from the traffic in the network, to form normalized data. The networking device applies a data transformation to the normalized data, to form transformed data. The networking device identifies, based on a policy, one or more cloud providers as being authorized to receive the transformed data. The networking device sends the transformed data to the one or more cloud providers.

20 Claims, 7 Drawing Sheets

(56) References Cited

U.S. PATENT DOCUMENTS

| | | | |
|---|---|---|---|
| 2015/0295765 A1* | 10/2015 | Dickey | H04L 41/0856 709/220 |
| 2016/0182639 A1 | 6/2016 | Hong et al. | |
| 2016/0182652 A1* | 6/2016 | Bevilacqua | G06F 9/546 709/203 |
| 2018/0054490 A1 | 2/2018 | Wadhwa et al. | |
| 2018/0316555 A1 | 11/2018 | Salgueiro et al. | |
| 2018/0316681 A1 | 11/2018 | Frahim et al. | |
| 2019/0044703 A1 | 2/2019 | Smith | |
| 2019/0158606 A1 | 5/2019 | Bernat et al. | |

OTHER PUBLICATIONS

Bhardwaj, Mohit, "How IoT Gateway Clustering Ensures Reliability & High Availability", online: https://www.einfochips.com/blog/iot-gateway-architecture-clustering-ensures-reliability/, Aug. 2017 (printed Jun. 2020), 5 pages, eInfoChips.

Calabretta, et al., "MQTT-Auth: a Token-Based Solution to Endow MQTT with Authentication and Authorization Capabilities", Journal of Communications Software and Systems, vol. 14, No. 4, Dec. 2018, pp. 320-331.

Liu, et al., "Software-Defined Edge Cloud Framework for Resilient Multitenant Applications", Wireless Communications and Mobile Computing, vol. 2019, Article ID 3947286, Jan. 2019, 17 pages, Hindawi.

Pan, et al., "EdgeChain: An Edge-IoT Framework and Prototype Based on Blockchain and Smart Contracts", arXiv:1806.06185v1, Jun. 2018, 14 pages.

Samaniego, et al., "Zero-Trust Hierarchical Management in IoT", 2018 IEEE International Congress on Internet of Things, Jul. 2018, pp. 88-95, IEEE.

Sengul, et al. "MQTT-TLS Profile of ACE", draft-ietf-ace-mqtt-tls-profile-05, ACE Working Group Internet Draft, May 2020, 29 pages, IETF Trust.

Weber, Yannick, "Implementing MQTT Challenge-Response Authentication", online: https://www.hivemq.com/blog/implementing-challenge-response-auth/, Mar. 2020, 12 pages.

* cited by examiner

EDGE TO MULTI-CLOUD DATA PROCESSING AND GOVERNANCE

TECHNICAL FIELD

The present disclosure relates generally to computer networks, and, more particularly, to edge to multi-cloud data processing and governance.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

As the IoT evolves, the variety of IoT devices will continue to grow, as well as the number of applications associated with the IoT devices. For instance, multiple cloud-based, business intelligence (BI) applications may take as input measurements captured by a particular IoT sensor. The lack of harmonization between data consumers, however, can lead to overly complicated data access policies, virtual models of IoT devices (e.g., 'device twins' or 'device shadows') that are often not portable across cloud providers, and increased resource consumption.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a networking device at an edge of a network extracts data from traffic in the network using a plurality of protocol connectors of the networking device. The networking device normalizes the data extracted from the traffic in the network, to form normalized data. The networking device applies a data transformation to the normalized data, to form transformed data. The networking device identifies, based on a policy, one or more cloud providers as being authorized to receive the transformed data. The networking device sends the transformed data to the one or more cloud providers.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
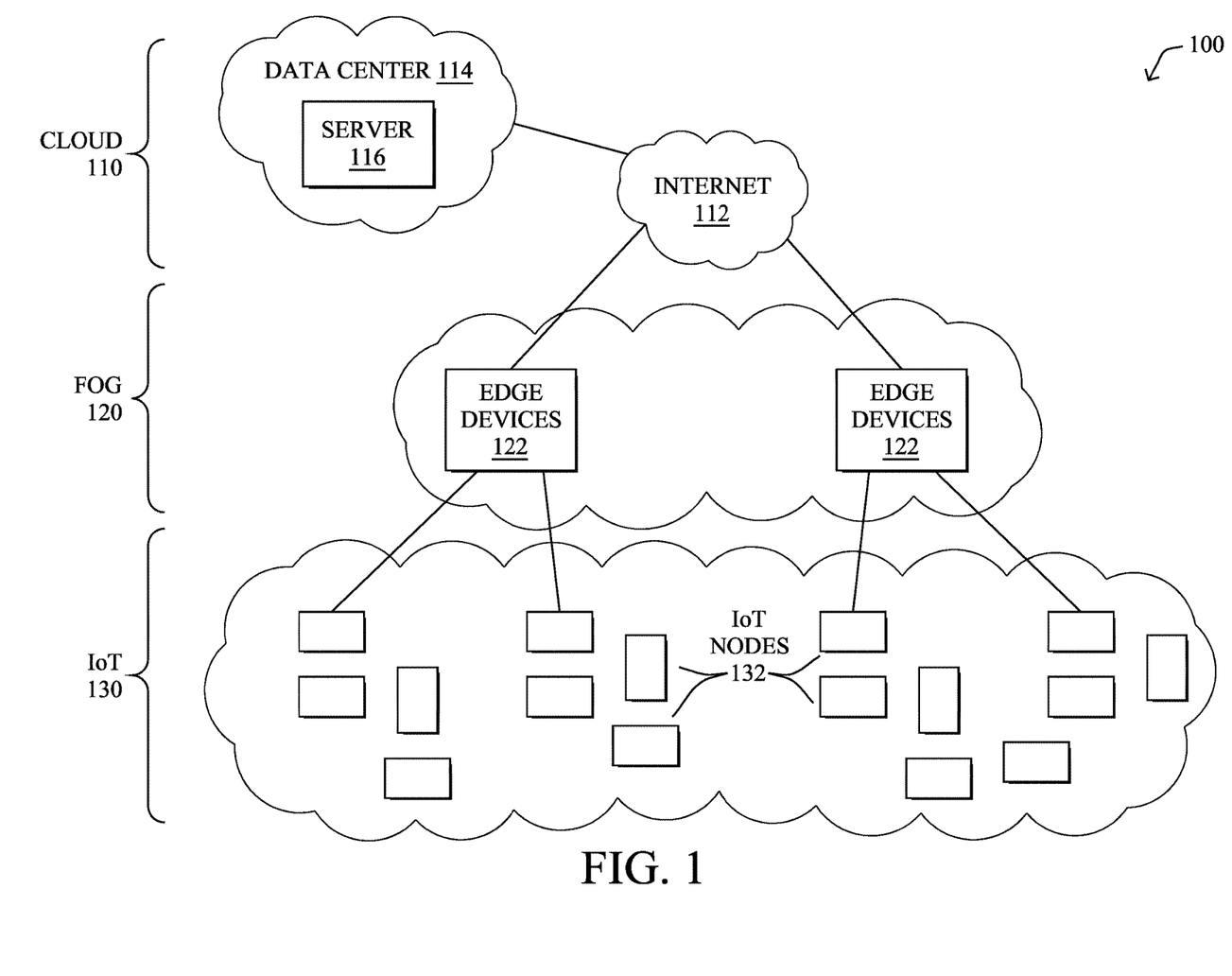
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
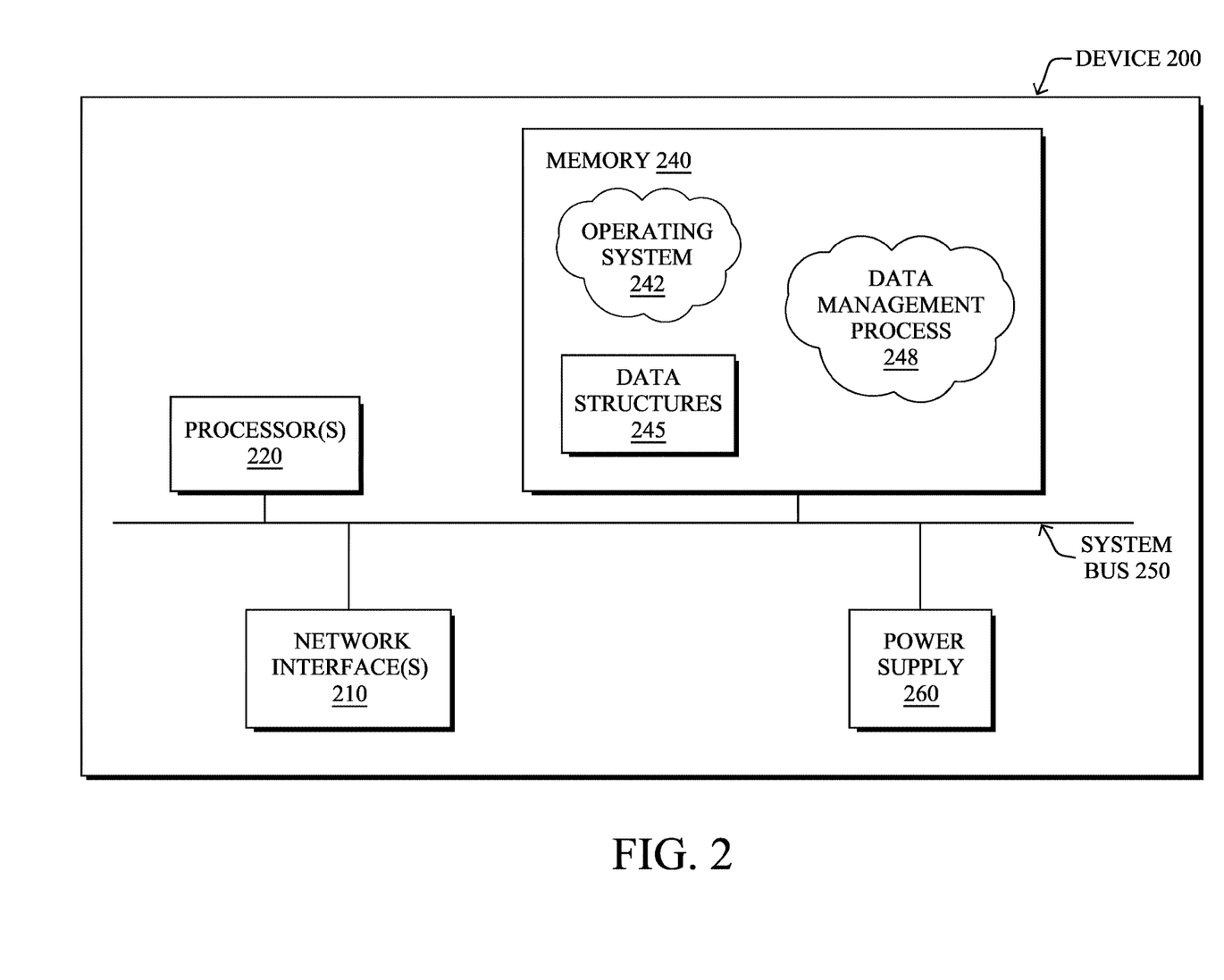
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative data management process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
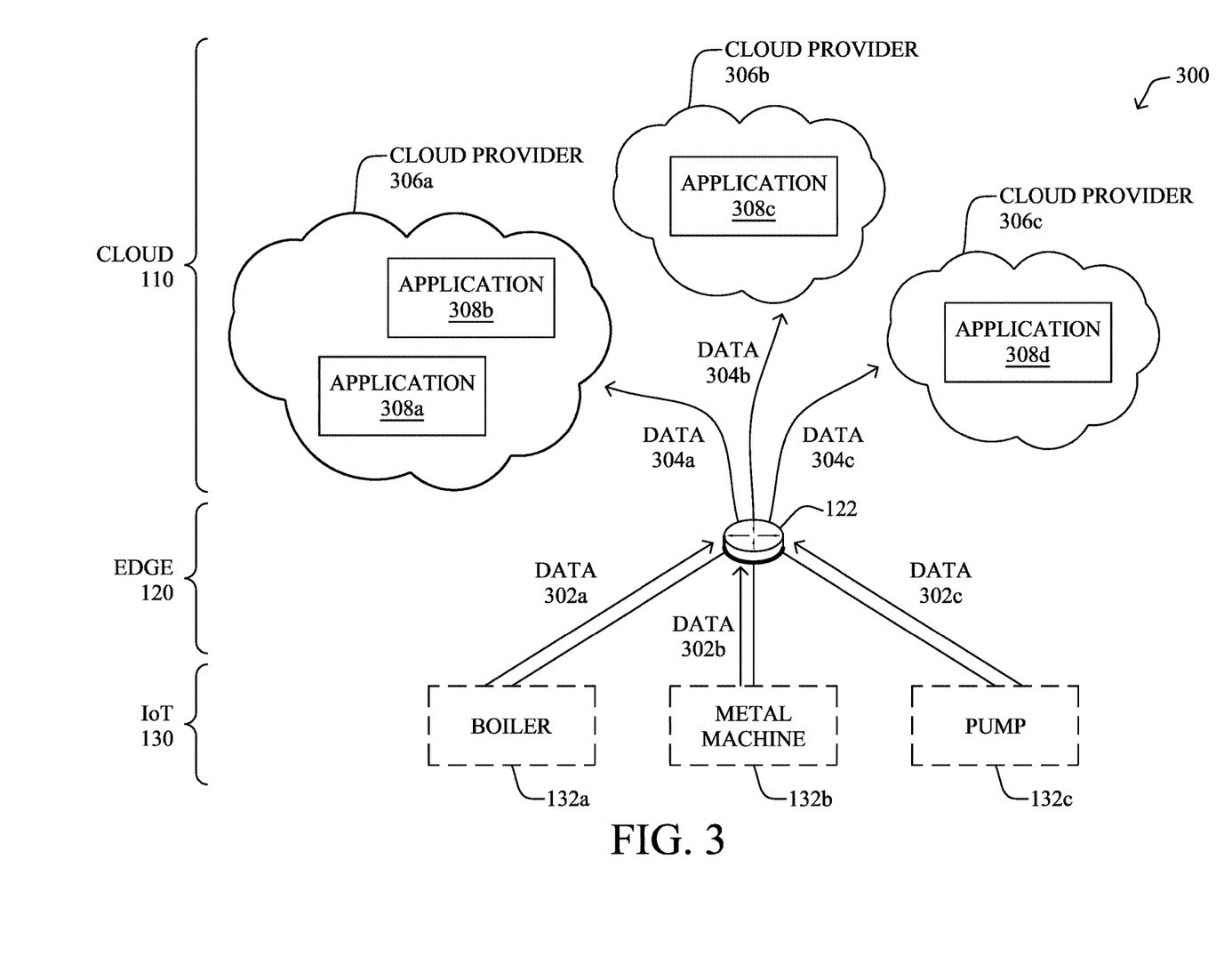
FIG. 3 illustrates an example network architecture for edge to multi-cloud processing and governance.

FIG. 3 illustrates an example network architecture 300 for edge to multi-cloud processing and governance, according to various embodiments. As shown, consider the case of an IoT network at IoT layer 130 that comprises a plurality of nodes 132, such as node 132a (e.g., a boiler), node 132b (e.g., a metal machine), and node 132c (e.g., a pump). Notably, the IoT network at IoT layer 130 may comprise any numbers of sensors and/or actuators. For instance, the network may be located in an industrial setting, such as a factory, port, substation, or the like, a smart city, a stadium, a conference or office building, or any other location in which IoT devices may be deployed.

As noted above, as the IoT evolves, the variety of IoT devices will continue to grow, as well as the number of applications associated with the IoT devices. As a result, multiple cloud-based applications may take as input measurements or other data generated by a particular IoT device/node. For instance, as shown, assume that IoT nodes 132a-132c generate data 302a-302c, respectively, for consumption by any number of applications 308 hosted by different cloud providers 306, such as Microsoft Azure. Software AG, Quantela, MQTT/DC, or the like.

To complicate the collection and distribution of data 302a-302c, the different applications 308 may also require different sets of data 304a-304c from data 302a-302c. For instance, assume that cloud provider 306a hosts application 308a, which is a monitoring application used by the operator of the IoT network. In addition, cloud provider 306a may also host application 308b, which is a developer application that allows the operator of the IoT network to develop and deploy utilities and configurations for the IoT network. Another application, application 308c, may be hosted by an entirely is different cloud provider 306b and be used by the vendor or manufacturer of a particular IoT node 132 for purposes. Finally, a further application, application 308d, may be hosted by a third cloud provider 306c, which is used by technicians for purposes of diagnostics and the like.

From the standpoint of the edge device 122, such as a router or gateway at the edge of the IoT network, the lack of harmonization between data consumers can lead to overly complicated data access policies, virtual models of IoT nodes 132 (e.g., 'device twins' or 'device shadows') that are often not portable across cloud providers 306, and increased resource consumption. In addition, different IoT nodes may communicate using different protocols within the IoT network. For instance, IoT nodes 132a-132c may communicate using MQTT, Modbus, OPC Unified Architecture (OPC UA), combinations thereof, or other existing communication protocols that are typically used in IoT networks. As a result, the various data pipelines must be configured on an individual basis at device 122 and for each of the different combinations of protocols and destination cloud providers 306.

Edge to Multi-Cloud Data Processing and Governance

The techniques herein allow for data to be extracted, transformed, and sent from the edge of an IoT network to any number of applications hosted across different cloud vendors. In some aspects, the data extraction, transformation, and distribution may be controlled by policy, so as to restrict what data is shared and provide a uniform approach to the distribution of the data from the IoT network.

Illustratively, the techniques described herein may be performed by hardware, software, and/or firmware, such as in accordance with the data management process 248, which may include computer executable instructions executed by the processor 220 (or independent processor of interfaces 210) to perform functions relating to the techniques described herein.

Specifically, according to various embodiments, a networking device at an edge of a network extracts data from traffic in the network using a plurality of protocol connectors of the networking device. The networking device normalizes the data extracted from the traffic in the network, to form normalized data. The networking device applies a data transformation to the normalized data, to form transformed data. The networking device identifies, based on a policy, one or more cloud providers as being authorized to receive the transformed data. The networking device sends the transformed data to the one or more cloud providers.

Figure 4A:
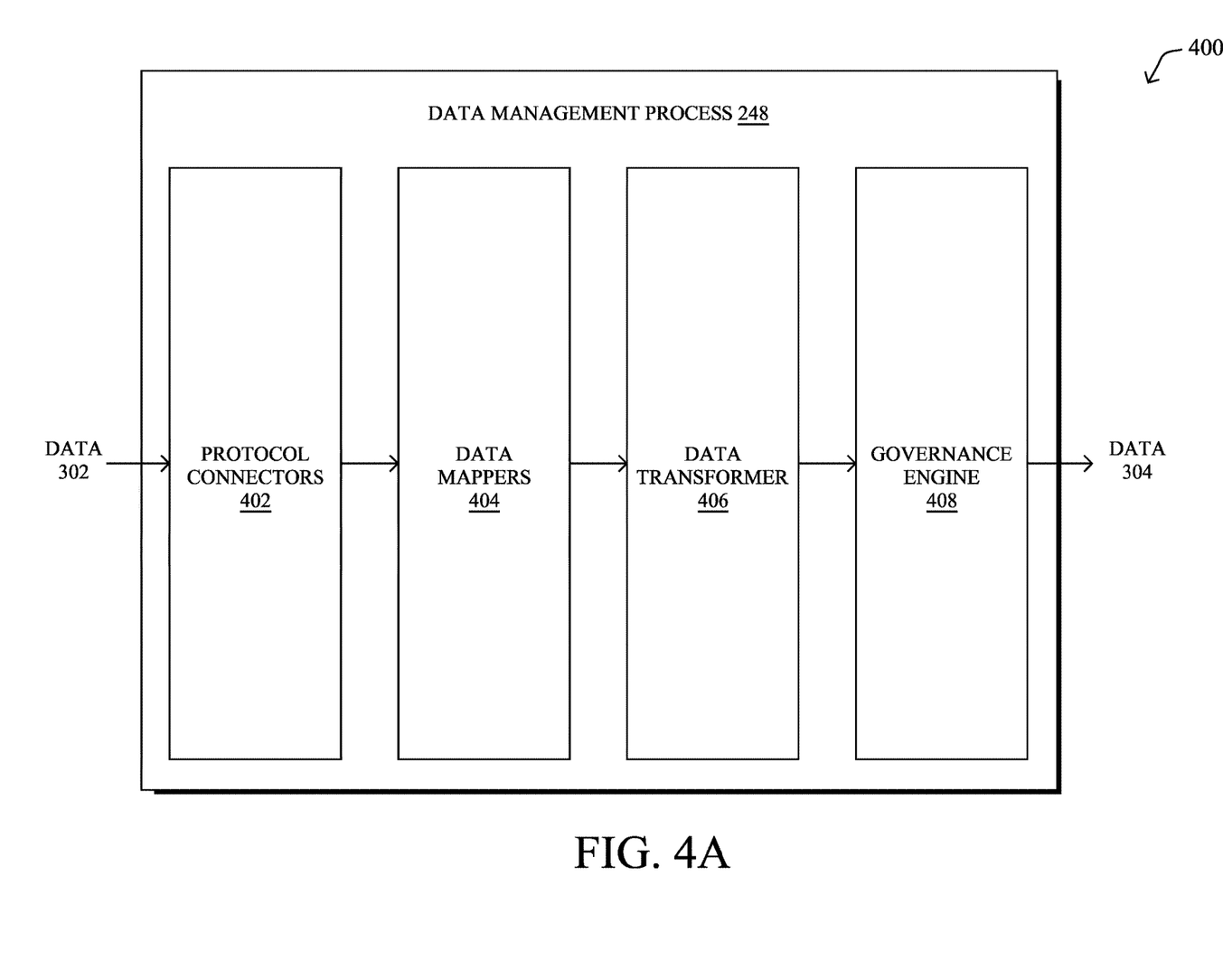
FIGS. 4A-4B illustrate examples of data processing by an edge device in a network.

Operationally, FIG. 4A illustrates an example architecture 400 for data management process 248, according to various embodiments. As shown, data management process 248 may comprise any or all of the following components: a plurality of protocol connectors 402, data mappers 404, a data transformer 406, and/or a governance engine 408. Typically, these components are executed on a single device located at the edge of the IoT network. However, further embodiments provide for these components to be executed in a distributed manner across multiple devices, in which case the combination of devices can be viewed as a singular device for purposes of the teachings herein. Further, functionalities of the components of architecture 400 may also be combined, omitted, or implemented as part of other processes, as desired.

During execution, protocol connectors 402 may comprise a plurality of southbound connectors that are able to extract data 302 from traffic in the IoT network sent via any number of different protocols. For instance, protocol connectors 402 may include connectors for OPC UA, Modbus, Ethernet/IP, MQTT, and the like. Accordingly, when the device executing data management process 248 (e.g., device 200) receives a message from the IoT network, such as a packet, frame, collection thereof, or the like, protocol connectors 402 may process the message using its corresponding connector to extract the corresponding data 302 from the message.

Once data management process 248 has extracted data 302 from a given message using the appropriate connector in protocol connectors 402, data mappers 404 may process the extracted data 302. More specifically, in various embodiments, data mappers 404 may normalize the extracted data 302. Typically, this may entail identifying the data extracted from the traffic in the network as being of a particular data type and grouping the data extracted from the traffic in the network with other data of the particular data type. In some instances, this may also entail associating a unit of measure with the extracted data 302 and/or converting a data value in one unit of measure to that of another.

In various embodiments, once data 302 has been extracted and normalized, data transformer 406 may apply any number of data transformation to the data. In some embodiments, data transformer 406 may transform data 302 by applying any number of mathematical and/or symbolic operations to it. For instance, data transformer 406 may apply a data compression or data reduction to the extracted and normalized data 302, so as to summarize or reduce the volume of data transmitted to the cloud. To do so, data transformer 406 may sample data 302 over time, compute statistics regarding data 302 (e.g., its mean, median, moving average, etc.), apply a compression algorithm to data 302, combinations thereof, or the like.

In further embodiments, data transformer 406 may apply analytics to the extracted and normalized data 302, so as to transform the data into a different representation, such as an alert or other indication. For instance, data transformer 406 may apply simple heuristics and/or thresholds to data 302, to transform data 302 into an alert. In another embodiment, data transformer 406 may apply machine learning to data 302, to transform the data.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Data transformer 406 may employ one or more supervised, unsupervised, or semi-supervised machine learning models. Generally, supervised learning entails the use of a training set of data that is used to train the model to apply labels to the input data. For example, the training data may include samples of 'good' readings or operations and 'bad' readings or operations that are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. For instance, an unsupervised model may Semi-supervised learning models take a middle ground approach that uses a greatly reduced set of labeled training data.

Example machine learning techniques that data transformer 406 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

In further embodiments, data transformer 406 may comprise a scripting engine that allows developers to deploy any number of scripts to be applied to data 302 for purposes of the functionalities described above. For instance, an application developer may interface with application 308*b* shown previously in FIG. 3, to develop and push various scripts for execution by data transformer 406, if allowed to do so by policy. In other cases, previously developed scripts may also be pre-loaded into data transformer 406 and/or made available by the vendor or manufacturer of the device executing data management process 248 for deployment to data transformer 406.

According to various embodiments, another potential component of data management process 248 is governance engine 408 that is responsible for sending the data 302 transformed by data transformer 406 to any number of cloud providers as data 304. In general, governance engine 408 may control the sending of data 304 according to a policy. For instance, governance engine 408 may apply a policy that specifies that data 304 may be sent to a particular cloud provider and/or cloud-based application, but should not be sent to others. In some embodiments, the policy enforced by governance engine 408 may control the sending of data 304 on a per-value or per-data type basis. For instance, consider the case of an IoT node reporting a temperature reading and pressure reading. In such a case, governance engine 408 may send the temperature reading to a particular cloud provider as data 304 while restricting the sending of the pressure reading, according to policy.

As would be appreciated, by unifying the policy enforcement via governance engine 408, the various stakeholders in the data pipelines are able to participate in the creation and maintenance of the enforced policies. Today, the various data pipelines built to support the different network protocols and cloud vendors results in a disparate patchwork of policies that require a level of expertise that not every participant may possess. In contrast, by unifying the policy enforcement via governance engine 408, personnel such as security experts, data compliance representatives, technicians, developers, and the like can participate in the administration of the policies enforced by governance engine 408.

Figure 4B:
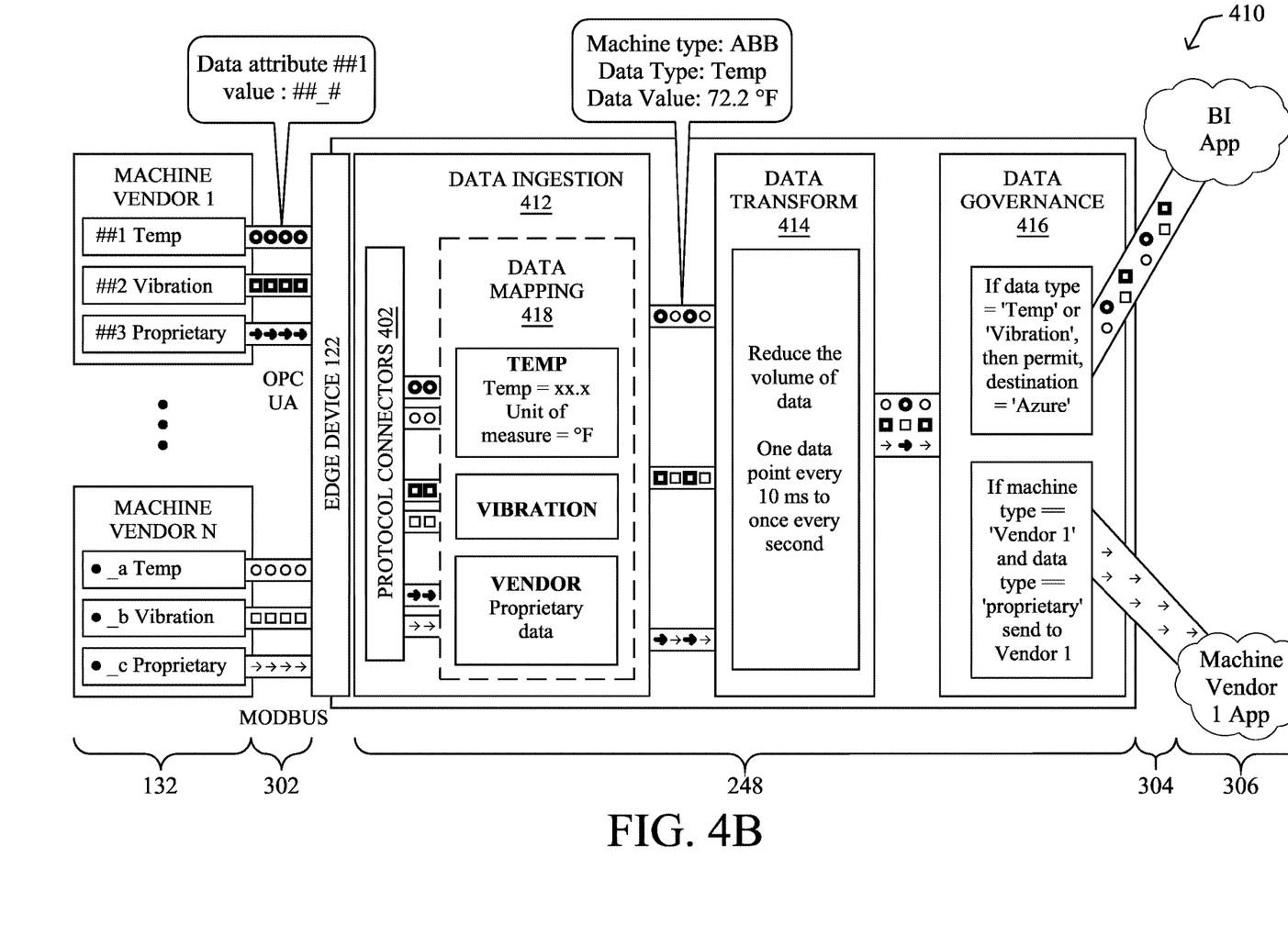

FIG. 4B illustrates an example 410 of the operation of data management process 248 during execution, according to various embodiments. As shown, assume that edge device 122 described previously (e.g., a device 200) executes data management process 248 at the edge of an IoT network that comprises IoT nodes 132. During operation, edge device 122 may communicate with IoT nodes 132 in the network that comprise devices from n-number of different vendors.

Each set of vendor devices in IoT nodes 132 may generate different sets of data, such as sensor readings, computations, or the like. For instance, the devices from a first machine vendor may generate data such as a proprietary data value, a temperature reading, and a vibration reading. Similarly, the devices from another machine vendor may generate data such as a temperature reading, a vibration reading, and another data value that is proprietary to that vendor.

As would be appreciated, the data 302 generated from each group of IoT nodes 132 may use different formats that are set by the device vendors or manufacturers. For instance, two machines from different vendors may both report temperature readings, but using different data attribute labels (e.g., "temp=," "temperature=," "##1," "*_a," etc.). In addition, the actual data values may differ by vendor, as well. For instance, the different temperature readings may report different levels of precision/number of decimals, use different units of measure (e.g., Celsius, Fahrenheit, Kelvin, etc.), etc.

Another way in which data 302 generated by IoT nodes 132 may differ is the network protocol used to convey data 302 in the network. For instance, the devices from one machine vendor may communicate using the OPC UA protocol, while the devices from another machine vendor may communicate using the Modbus protocol.

In response to receiving data 302 from IoT nodes 132, data management process 248 of edge device 122 may process data 302 in three stages: a data ingestion phase 412, a data transformation phase 414, and a data governance phase 416. These three processing phases operate in conjunction with one another to allow edge device 122 to provide data 304 to the various cloud providers 306 for consumption by their respective cloud-hosted applications.

During the data ingestion phase 412, protocol connectors 402 may receive messages sent by IoT nodes 132 in their respective protocols, parse the messages, and extract the relevant data 302 from the messages. For instance, one protocol connector may process OPC UA messages sent by one set of IoT nodes 132, while another protocol connector may process Modbus messages sent by another set of IoT nodes 132. Once protocol connectors 402 have extracted the relevant data 302 from the messages, data management process 248 may apply a data mapping 418 to the extracted data, to normalize the data 302. For instance, data management process 248 may identify the various types of reported data 302 and group them by type, such as temperature measurements, vibration measurements, and vendor proprietary data. In addition, the data mapping 418 may also entail standardizing the data on a particular format (e.g., a particular number of digits, unit of measure, etc.). The data mapping 418 may also entail associating metadata with the extracted data 302, such as the source device type, its vendor, etc.

During its data transformation phase 414, data management process 248 may apply various transformations to the results of the data ingestion phase 412. For instance, assume that one IoT node 132 reports its temperature reading every 10 milliseconds (ms). While this may be acceptable in the IoT network, and even required in some cases, reporting the temperature readings at this frequency to the cloud-providers may represent an unnecessary load on the WAN connection between edge device 122 and the cloud provider(s) 306 to which the measurements are to be reported. Indeed, a monitoring application in the cloud may only need the temperature readings at a frequency of once every second, meaning that the traffic overhead to the cloud provider(s) 306 can be reduced by a factor of one hundred by simply reporting the measurements at one second intervals. Accordingly, data transformation phase 414 may reduce the volume of data 304 sent to cloud provider(s) 306 by sending only a sampling of the temperature readings (e.g., every hundred), an average or other statistic(s) of the temperature readings in a given time frame, or the like.

During its data governance phase 416, data management process 248 may apply any number of different policies to the transformed data, to control how the resulting data 304 is sent to cloud provider(s) 306. For instance, one policy enforced during data governance phase 416 may specify that if the data type='Temp' or 'Vibration,' then that data is permitted to be sent to destination='Azure,' for consumption by a BI application hosted by Microsoft Azure. Similarly, another policy may specify that if the machine type='Vendor 1' and the data type='proprietary,' then the corresponding data can be sent to a cloud provider associated with the vendor.

In some embodiments, the policy enforced during data governance phase 416 may further specify how data 304 is sent to cloud providers 306. For instance, the policy may specify that edge device 122 should send data 304 to a particular cloud provider 306 via an encrypted tunnel, using a particular set of one or more protocols (e.g., MQTT), how the connection should be monitored and reported, combinations thereof, and the like.

Figure 5:
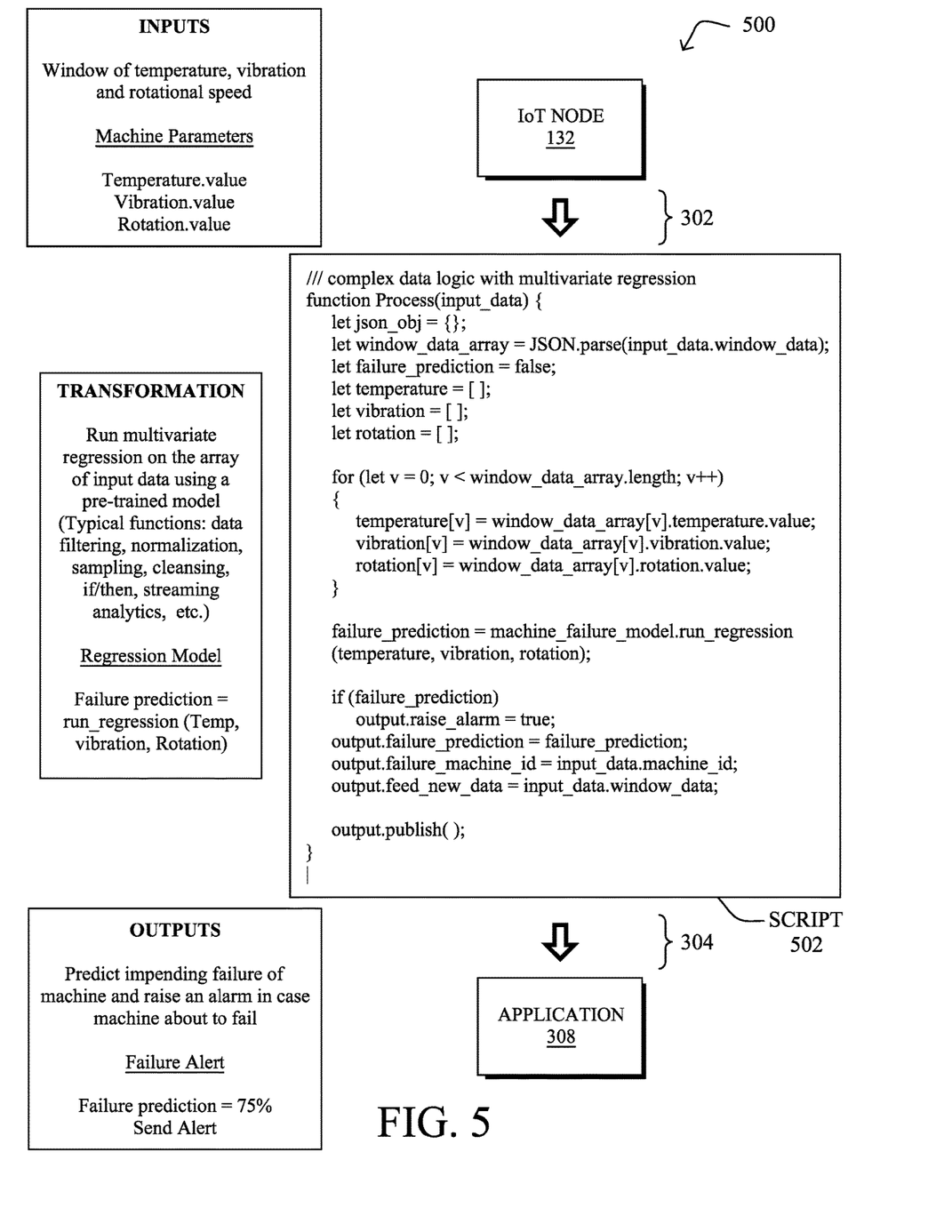
FIG. 5 illustrates an example of the application of a script to data extracted from traffic in a network.

FIG. 5 illustrates an example 500 of the application of a script to data extracted from traffic in a network, according to various embodiments. As noted previously with respect to FIG. 4A, some embodiments of data transformer 406 provide for data transformer 406 to comprise a scripting engine, allowing for customization of the data transformations applied to the data from the IoT nodes 132. For instance, as shown, assume that IoT node 132 generates machine parameters, such as 'temperature.value,' 'vibration.value,' and 'rotation.value,' and sends these parameters to the edge device as data 302.

During its data transformation phase, the edge device may execute a script 502 that takes as input the data 302 provided by IoT node 132, potentially after normalization. In turn, script 502 may perform multivariate regression on the array of input data using a pre-trained machine learning model. Doing so allows script 502 to predict whether IoT node 132 is likely to fail, given its reported temperature, vibration, and rotation measurements. Depending on the results of this prediction, such as when the probability of failure is greater than a defined threshold (e.g., >75%), script 502 may output a failure alert that identifies IoT node 132, the probability of failure, or other information that may be useful to a technician or other user.

In cases in which script 502 generates an alert, the edge device may provide the alert as data 304 to one or more cloud providers for consumption by a cloud-hosted application, such as application 308, in accordance with its data governance policy. Since the input data from IoT node 132 has been extracted to be protocol-independent and normalized, this allows script 502 to predict failures across machines from different vendors. In addition, as the alerting is handled directly on the edge device, this can greatly reduce overhead on its WAN connection, as the edge device may only be required to report alerts under certain circumstances (e.g., when the failure probability is greater than a threshold), rather than reporting the measurements themselves for the analysis to be performed in the cloud.

Figure 6:
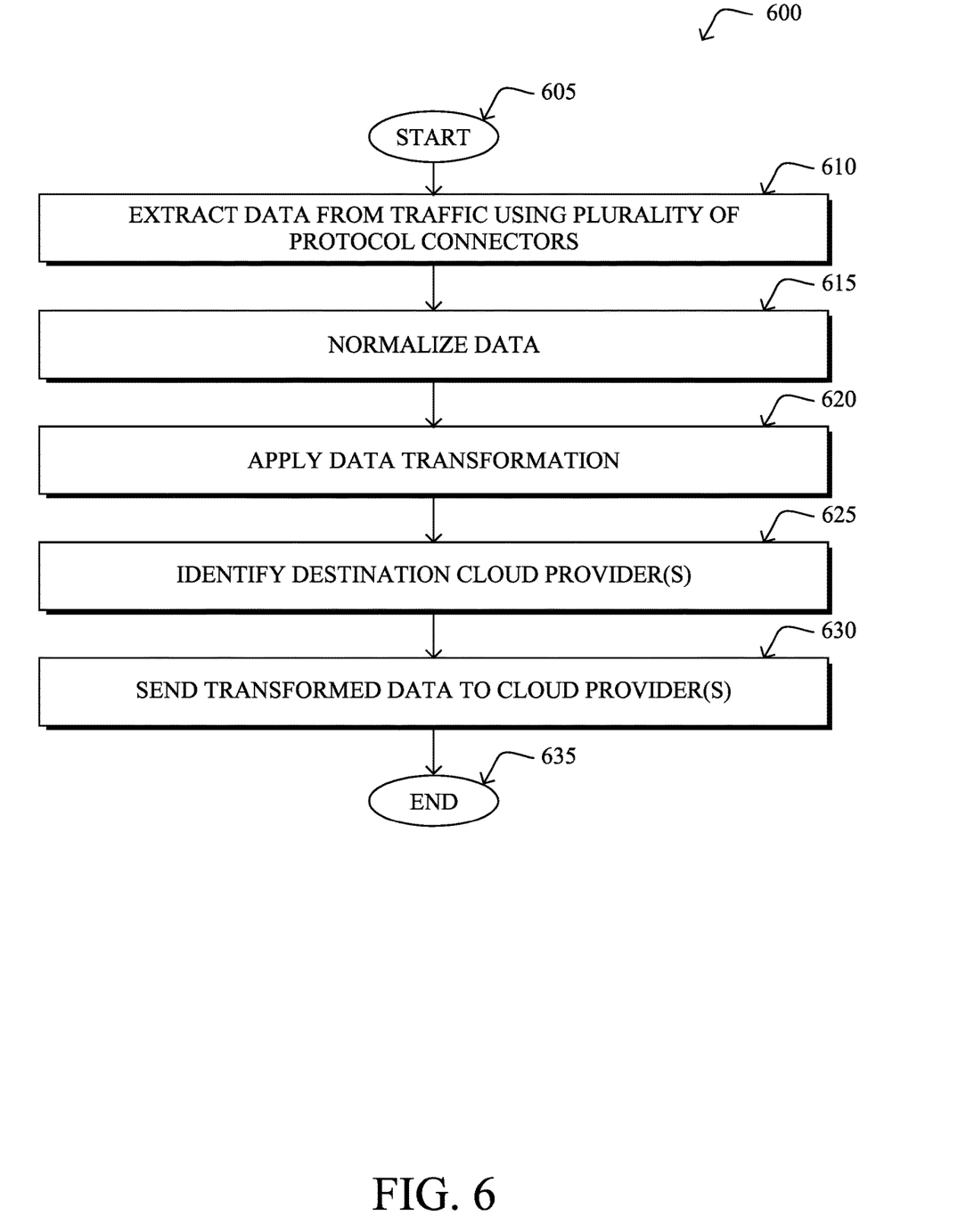
FIG. 6 illustrates an example simplified procedure for edge to multi-cloud data processing and governance.

FIG. 6 illustrates an example simplified procedure for edge to multi-cloud data processing and governance, in accordance with one or more embodiments described herein. The procedure 600 may start at step 605, and continues to step 610, where, as described in greater detail above, a networking device at an edge of a network (e.g., device 200), such as a router, gateway, or other piece of networking equipment, may extract data from traffic in the network using a plurality of protocol connectors of the networking device. In various embodiments, the traffic in the network may comprise messages sent by a plurality of devices (e.g., sensors, actuators, etc.) using a plurality of different communication protocols (e.g., one node sends messages using a first protocol, another sends messages using a second protocol, etc.). For instance, the plurality of different communication protocols may comprise one or more of: MQTT, Modbus, or OPC UA.

At step 615, as detailed above, the networking device may normalize the data extracted from the traffic in the network, to form normalized data. In various embodiments, the device may do so by identifying the data extracted from the traffic in the network as being of a particular data type and grouping the data extracted from the traffic in the network with other data of the particular data type. In further embodiments, the device may do so by converting a particular type of the data into a particular unit of measure, a certain degree of precision or number, a number of digits, a number of decimals, or the like. In further embodiments, the networking device may also normalize the data by associating metadata with it, such as the identity of its source device, the vendor of its source device, timestamp information, etc.

At step 620, the networking device may apply a data transformation to the normalized data, to form transformed data, as described in greater detail above. In various embodiments, this may entail using the normalized data as input to a script executed in a script engine of the networking device. Such a script may, for instance, apply a data compression or data reduction to the normalized data. In further embodiments, this may entail applying a machine learning model to the normalized data. For instance, the model may predict whether the source device is likely to fail given its reported data, whether the reported data is considered to be anomalous from an operational or security standpoint, or the like. In these cases, the transformed data may comprise an alert or other indication of the outputs of the model.

At step 625, as detailed above, the networking device may identify, based on a policy, one or more cloud providers as being authorized to receive the transformed data. For instance, the networking device may determine that a temperature reading is to be sent to Microsoft Azure, an alert is to be sent to MQTT, etc.

At step 630, the networking device may send the transformed data to the one or more cloud providers, as described in greater detail above. In some embodiments, the networking device may do so via an encrypted tunnel, using one or more protocols specified by the policy, or in accordance with any other configuration. In turn, the sent data may be used as input by application(s) hosted by the cloud providers, such as a BI application, a developer application, a vendor application, or the like. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for data in an IoT network to be extracted, transformed, and delivered to different cloud-based applications according to policy. In some aspects, the techniques herein connect and standardize data at the edge of the IoT network, in a protocol-agnostic manner. In further aspects, the techniques herein allow for the real-time management of the connectivity of the data pipelines and identification of data issues. Further, the techniques herein allow for data governance plans to be unified in a manner, allowing for input from cybersecurity, operations compliance, and other teams.

While there have been shown and described illustrative embodiments for edge to multi-cloud data processing and governance, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   extracting, by a networking device at an edge of a network, data from traffic in the network using a plurality of protocol connectors of the networking device;
   normalizing, by the networking device, the data extracted from the traffic in the network, to form normalized data;
   applying, by the networking device, a data transformation to the normalized data, to form transformed data;
   identifying, by the networking device and based on a policy, one or more cloud providers as being authorized to receive the transformed data; and
   sending, by the networking device, the transformed data to the one or more cloud providers.

2. The method as in claim 1, wherein the traffic in the network comprises messages sent using a plurality of different communication protocols.

3. The method as in claim 2, wherein the plurality of different communication protocols comprises one or more of: Message Queuing Telemetry Transport (MQTT), Modbus, or OPC Unified Architecture (OPC UA).

4. The method as in claim 1, wherein normalizing the data extracted from the traffic in the network, to form the normalized data, comprises:

identifying the data extracted from the traffic in the network as being of a particular data type; and grouping the data extracted from the traffic in the network with other data of the particular data type.

5. The method as in claim 1, wherein applying the data transformation to the normalized data comprises:

using the normalized data as input to a script executed in a script engine of the networking device.

6. The method as in claim 5, wherein the script applies a data compression or data reduction to the normalized data.

7. The method as in claim 1, wherein applying the data transformation to the normalized data comprises:

applying a machine learning model to the normalized data.

8. The method as in claim 1, wherein the networking device comprises an edge router or gateway of the network.

9. The method as in claim 1, wherein the traffic in the network is transmitted by a plurality of sensors in the network.

10. An apparatus, comprising:

one or more network interfaces to communicate with a network;

a processor coupled to the one or more network interfaces and configured to execute one or more processes; and a memory configured to store a process that is executable by the processor, the process when executed configured to:

extract data from traffic in the network using a plurality of protocol connectors of the apparatus;

normalize the data extracted from the traffic in the network, to form normalized data;

apply a data transformation to the normalized data, to form transformed data;

identify, based on a policy, one or more cloud providers as being authorized to receive the transformed data; and send the transformed data to the one or more cloud providers.

11. The apparatus as in claim 10, wherein the traffic in the network comprises messages sent using a plurality of different communication protocols.

12. The apparatus as in claim 11, wherein the plurality of different communication protocols comprises one or more of: Message Queuing Telemetry Transport (MQTT), Modbus, or OPC Unified Architecture (OPC UA).

13. The apparatus as in claim 10, wherein the apparatus normalizes the data extracted from the traffic in the network, to form the normalized data, by:

identifying the data extracted from the traffic in the network as being of a particular data type; and grouping the data extracted from the traffic in the network with other data of the particular data type.

14. The apparatus as in claim 10, wherein the apparatus applies the data transformation to the normalized data by:

using the normalized data as input to a script executed in a script engine.

15. The apparatus as in claim 10, wherein the apparatus applies the data transformation to the normalized data by applying a data compression or data reduction to the normalized data.

16. The apparatus as in claim 10, wherein the apparatus applies the data transformation to the normalized data by:

applying a machine learning model to the normalized data.

17. The apparatus as in claim 10, wherein the apparatus comprises an edge router or gateway of the network.

18. The apparatus as in claim 10, wherein the traffic in the network is transmitted by a plurality of sensors in the network.

19. The apparatus as in claim 10, wherein the transformed data comprises an alert.

20. A tangible, non-transitory, computer-readable medium storing program instructions that cause a networking device at an edge of a network to execute a process comprising:

extracting, by the networking device, data from traffic in the network using a plurality of protocol connectors of the networking device;

normalizing, by the networking device, the data extracted from the traffic in the network, to form normalized data;

applying, by the networking device, a data transformation to the normalized data, to form transformed data;

identifying, by the networking device and based on a policy, one or more cloud providers as being authorized to receive the transformed data; and sending, by the networking device, the transformed data to the one or more cloud providers.

* * * * *

UNITED STATES PATENT AND TRADEMARK OFFICE
CERTIFICATE OF CORRECTION

PATENT NO. : 11,190,579 B1
APPLICATION NO. : 16/931868
DATED : November 30, 2021
INVENTOR(S) : Barton et al.

Page 1 of 1

It is certified that error appears in the above-identified patent and that said Letters Patent is hereby corrected as shown below:

In the Specification

Column 5, Line 55, should read:
different cloud providers 306, such as Microsoft Azure, Column 5, Line 67, should read:
entirely different cloud provider 306b and be used by the In the Claims Column 12, Line 44, should read:
1. A method, comprising:

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*